United States Patent [19]

Maeda

[11] Patent Number: 5,412,635
[45] Date of Patent: May 2, 1995

[54] OPTICAL DISK WITH SIGNAL PIT RECORDING FORMAT, METHOD OF RECORDING SAME AND OPTICAL PICKUP

[75] Inventor: Takanori Maeda, Tokorozawa, Japan

[73] Assignee: Pioneer Electronic Corporation, Tokyo, Japan

[21] Appl. No.: 238,973

[22] Filed: May 5, 1994

Related U.S. Application Data

[63] Continuation of Ser. No. 927,807, Aug. 10, 1992, abandoned.

[30] Foreign Application Priority Data

Sep. 27, 1991 [JP] Japan .................. 3-249186

[51] Int. Cl.⁶ .................................. G11B 7/095
[52] U.S. Cl. .................. 369/44.26; 369/109; 369/111; 369/120; 369/121; 369/275.3; 369/275.4
[58] Field of Search ............ 369/44.23–44.25, 369/44.26, 44.34, 44.37, 44.41, 100, 103, 109–112, 120–122, 124, 275.3, 275.4

[56] References Cited

U.S. PATENT DOCUMENTS

| | | |
|---|---|---|
| 3,939,302 | 2/1976 | Kihara . |
| 4,260,858 | 4/1981 | Beiser .................. 369/103 |
| 4,353,077 | 10/1982 | Gokey et al. . |

FOREIGN PATENT DOCUMENTS

| | | |
|---|---|---|
| 0122144 | 10/1984 | European Pat. Off. . |
| 0418879 | 3/1991 | European Pat. Off. . |
| 1942648 | 8/1969 | Germany . |
| 2278135 | 2/1976 | Germany . |
| 1285999 | 8/1972 | United Kingdom . |
| 1461028 | 1/1977 | United Kingdom . |

Primary Examiner—W. R. Young
Attorney, Agent, or Firm—Kane, Dalsimer, Sullivan, Kurucz, Levy, Eisele and Richard

[57] ABSTRACT

An optical disk includes a recording medium having a disk shape, and a plurality of signal pit strings formed on the recording medium and arranged in a circumferential direction of the optical disk. Each of the signal pit strings includes a plurality of signal pits arranged in a line in a radial direction of the optical disk. An optical pickup apparatus includes a photodetector having a plurality of photoelectric elements. A light spot is sequentially projected onto the signal pit strings, and a reflected light therefrom is converged by an objective lens. An image formed by the objective lens is detected by the photodetector located in an image forming position of the objective lens. The unit information pieces contained in one of the signal pit strings are simultaneously read by the photoelectric elements. In this manner, the signal pit strings are sequentially read while the optical disk is being rotated.

14 Claims, 9 Drawing Sheets

PRIOR ART

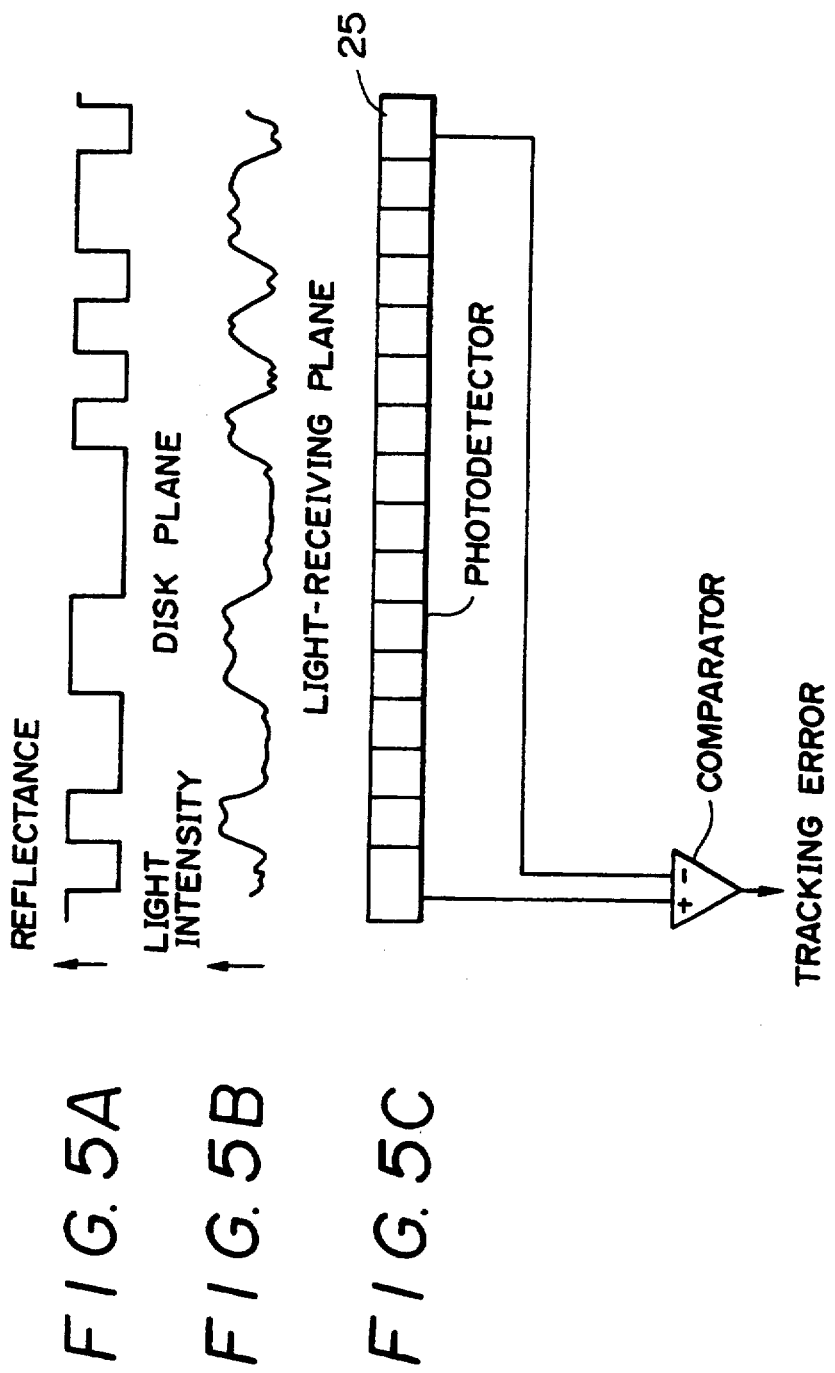

F I G. 7
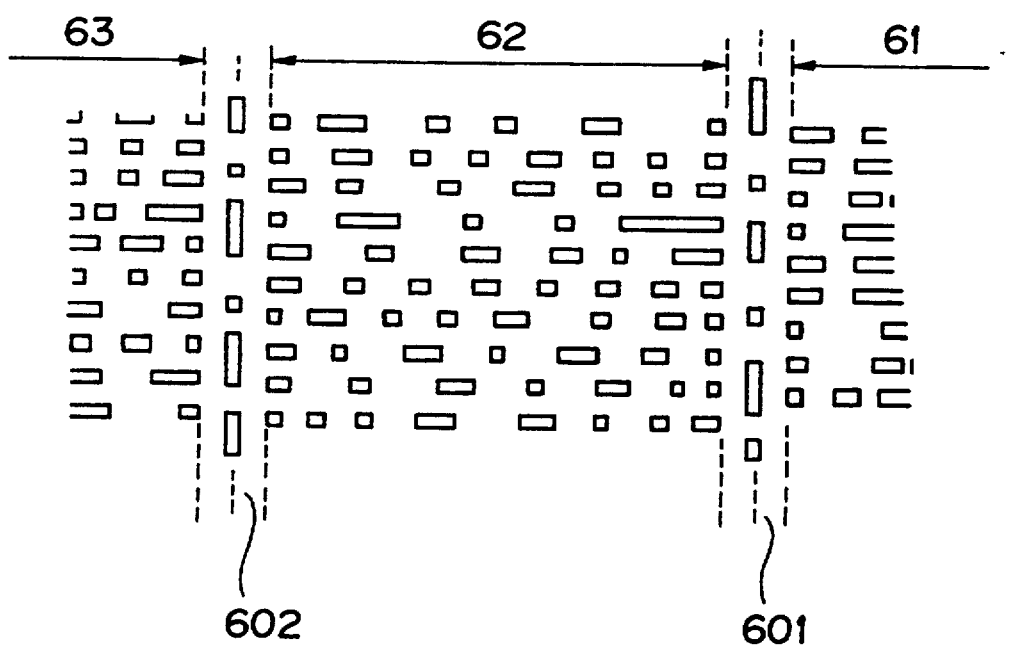

OPTICAL DISK WITH SIGNAL PIT RECORDING FORMAT, METHOD OF RECORDING SAME AND OPTICAL PICKUP

This application is a continuation, of application No. 07/927,907, filed Aug. 10, 1992, now abandoned.

BACKGROUND OF THE INVENTION

1. Field of the Invention

The present invention generally relates to an optical disk as one kind of optical recording media on which signals, such as image information, audio information etc. are recorded, to a method of recording the optical disk and to an optical pickup apparatus for reproducing signals recorded on the optical disks. More particularly, the present invention is concerned with a recording format of signal pits formed on an optical disk. Furthermore, the present invention relates to an arrangement of a light path and a light detection means in an optical pickup apparatus for reproducing signals recorded on such an optical disk.

2. Description of the Related Art

An optical disk is a recording medium for recording a large amount of digital and analog information, such as image and audio information. A reflection type reproducing system can be used for reproducing the signals recorded on the optical disk. In the reflection type reproducing system, laser beams are projected onto the optical disk, and recorded information is reproduced from light beams reflected by a signal recording plane of the optical disk. The reflection type reproducing system can be configured by a simple structure and made compact.

The reflection type optical disks are categorized into a ROM optical disk, a write once optical disk or a recordable optical disk. In any of these types, information is recorded in the form of pits formed on the recording plane of the optical disk. Pits are spirally arranged in a line from an inner circumference of the disk to an outer circumference thereof. One signal track is defined as one turn of pits. A process for positioning the light beams on the optical disk is carried out for each signal track. It will be noted that the term "pit" originally means a hole or recess, but here includes a case where the recording of information is performed without a change in the shape of the recording plane. In magneto-optical recording or phase change recording, information is recorded without change in the shape of the recording plane.

This type of optical pickup apparatus is provided with, for example, a lateral mode or a single transverse mode semiconductor laser and a photodetector. The semiconductor laser forms a point light source, which has a light emitting point having a diameter of approximately 0.1 μm. The half mirror may be disposed to separate a projection light emitted from the semiconductor laser and directed to an optical disk, from a reflected light therefrom. The photodetector detects the reflected light. The laser beams emitted from the semiconductor laser are reflected by the half mirror, and form an image on the recording plane of the optical disk by means of the objective lens. The wavelength λ of the semiconductor laser and the numerical aperture NA are selected so that λ/NA is greater than 0.1 μm. Hence, the size of the spot on the optical disk is limited to λ/NA due to a diffraction limit.

As has been described previously, information is recorded on the optical disk in the form of pits, which cause optical change. The explanation will be made hereinbelow as for the case that the pits formed on the recording plane cause a change in the refractive index.

In this case, the recording of information is performed by sensitizing pigment contained in a recording layer or changing the state of the recording layer to a crystal state or an amorphous state, so that areas having different refractive index values are formed on the recording plane. The reflected light from the recording plane, which has different intensity levels due to the differences in the refractive index, is converged by the objective lens. Some of the reflected light passes through the half mirror. At this time, the half mirror causes the reflected light to have an astigmatism characteristic. Accordingly, the reflected light from the half mirror has different converting positions in the longitudinal and lateral directions perpendicular to the light axis. The photodetector is located between these different converging positions in order to enable focusing operation.

As shown in FIG. 1A to 1C, this type of photodetector 101 consists of four equally divided photodiodes. FIG. 1A shows a case where the focusing position is far from the recording plane, and FIG. 1C shows a case where the focusing position is close to the recording plane. FIG. 1B shows a case where the focusing position is on the recording plane. The position of the photodetector 101 is adjusted so that the light spot shown in FIG. 1B is obtained. A focusing error can be detected by calculating the difference between diagonal components of the light spot formed on the photodiodes. The focusing control is performed based on the focusing error thus calculated. It will be noted that the light spot identical to that formed on the photodiodes is not formed on the optical disk. Namely, the light spot formed on the photodiode is a so-called far field pattern, which is shifted by a half of the difference between the converging positions. Japanese Patent Publication No. 52-50131 discloses a structure in which a signal for use in focusing is detected at the focusing position. With this structure, it becomes possible to suppress the movement of the light spot on the photodetector.

In the above described type of optical pickup apparatus, if the distance between the adjacent signal tracks is made reduced in order to increase the signal recording density, the light spot formed on the signal track becomes to be significantly affected by a change in the reflectance of adjacent signal tracks. Hence, leakage of light from the adjacent signal tracks takes place, and the S/N ratio of the reproduced signal is degraded.

Japanese Patent Application Laid-Open Publication No. 57-58248 discloses a high-density reading method, in which a plurality of light sources are used. Three adjacent signal tracks are projected by these light sources, and far-field patterns respectively formed by the light sources are detected by photodetectors. The output signals of the photodetectors corresponding to the respective far-field patterns are mutually subtracted from each other in accordance with a leak rate measured beforehand. Using the results of the above calculation, the quantity of leakage is to be reduced. However, the above method needs a light spot having a size corresponding to the diffraction limit. If the interval between the adjacent signal tracks is made smaller than the limited size of the light spot, the influence of the outer signal track will take place. As a result, the above method does not bring about the great improvements.

As described above, it is very difficult to improve the information recording density on the optical disk by narrowing the distance between the adjacent signal tracks.

On the other hand, it is required that information be more rapidly read as an increased amount of information is recorded on the optical disk. Particularly, it is necessary to use a broadband recording and reproducing system capable of recording and reproducing high-frequency signals in order to record and reproduce information used in a high definition television system, for example. In order to realize such a broadband recording and reproducing system, it has been attempted to more finely record information on the optical disk, and read an increased number of pits per unit time, or per unit length.

However, the fine recording of information needs a smaller minimum pit length on the optical disk. In order to reproduce the original images at such a required resolution level, it becomes necessary to broad a spatial frequency band of the optical pickup apparatus used for reproduction. For this requirement, it is necessary to shorten the wavelength of the light source or increase the numerical aperture of the objective lens. The currently available semiconductor laser devices cannot emit light having such a required wavelength. Thus, it is necessary to use a gas laser or a laser using a non-linear optical element. An increased numerical aperture needs a flatter optical disk or an optical disk having a uniform disk surface. However, It is very difficult to produce such optical disks. As a result, it is very difficult to broad the spatial frequency band for reproduction.

It may be possible to rotate the optical disk at a higher speed in order to reproduce signals in a high-frequency band. However, in this case it is necessary to use a more powerful motor for rotating the optical disk. In addition, it is difficult to control the focusing position following an increased revolution of the motor.

SUMMARY OF THE INVENTION

It is therefore an object of the present invention to provide an optical disk, a method of recording the optical disk and an optical pickup apparatus which enables recording and/or reproducing information in a broader frequency band.

According to the present invention, the above object can be achieved by an optical disk provided with: a recording medium having a disk shape; and a plurality of signal pit strings formed on the recording medium arranged in a circumferential direction of the optical disk, each of the signal pit strings including a plurality of signal pits arranged in a line in a radial direction of the optical disk.

According to the present invention, the above mentioned object can be achieved by a method of recording signals on an optical disk. The recording method includes the step of: forming a plurality of signal pit strings on the optical disk such that the signal pit strings are arranged in a circumferential direction of the optical disk and that each of the signal pit strings includes a plurality of signal pits arranged in a line in a radial direction of the optical disk.

According to the present invention, the above mentioned object can be also achieved by an optical pickup apparatus for reproducing an optical disk in which a plurality of signal pit strings are arranged in a circumferential direction of the optical disk, and each of the signal pit strings includes a plurality of signal pits arranged in a line in a radial direction of the optical disk. The optical pickup apparatus is provided with: a light spot projection device for projecting a light spot onto the optical disk; a lens device, operatively coupled to the light spot projection device, for converging a reflected light from the light spot; and a photodetector device including a plurality of photoelectric elements, for simultaneously reading a plurality of unit information pieces contained in one of the signal pit strings at which the light spot is sequentially projected. The photoelectric elements have respective light receiving planes located in a position where the reflected light from the lens device forms an image.

According to the present invention, the above mentioned object can be achieved by another optical pickup apparatus for reproducing an optical disk in which a plurality of signal pit strings are arranged in a circumferential direction of the optical disk, and each of the signal pit strings includes a plurality of signal pits arranged in a line in a radial direction of the optical disk. The optical pickup apparatus is provided with: a linear light source having a linear light source image; an objective lens for converging a light from the linear light source to project a light spot onto one of the signal pit strings and for converging a reflected light therefrom; a beam splitter for orienting the light from the linear light source toward the optical disk and allowing the reflected light from the objective lens to pass therethrough; and a photodetector device including a plurality of photoelectric elements, for simultaneously reading a plurality of unit information pieces contained in one of the signal pit strings at which the light spot is sequentially projected. The photoelectric elements have respective light receiving planes located at a position where the reflected light from the objective lens forms an image.

According to the above mentioned optical disk, recording method, optical pickup apparatus of the present invention, the light spot can be sequentially projected onto the signal pit strings of the optical disk and a plurality of unit information pieces are simultaneously read by the photoelectric elements in the optical pickup apparatus, receiving a linear image formed by the reflected light obtained by sequentially projecting the light spot onto the signal pit strings. With this structure, it becomes possible to improve the information reading speed and the information transferring speed. Further, since the focused image formed by the reflected light from the signal pit string is used, the signal resulting from the signal pit string has a reduced crosstalk, and hence an increased recording density can be obtained. Furthermore, since the light spot can be formed by a less-expensive light source, such as a light-emitting diode, it is not necessary to build a laser resonator-in an opto-electric integrated circuit. Hence, a simple and compact optical pickup apparatus can be produced.

In one aspect of the optical disk of the present invention, each of the signal pit strings has a predetermined length in the radial direction; and the signal pit strings are spirally arranged in the circumferential direction to form a spiral signal track. The signal pit strings may be obliquely arranged at a predetermined angle in the spiral signal track. Particularly, the signal pit strings may be obliquely arranged such that the signal pit strings adjacent to each other with respect to the radial direction are obliquely arranged at different angles with each other.

In another aspect of the optical disk of the present invention, the optical disk is further provided with: another signal track interposed between adjacent turns of the spiral signal track and including a plurality of pits arranged in the circumferential direction. The signal pit strings adjacent to each other with respect to the circumferential direction may be spaced from each other at variable intervals modulated by information to be recorded on the optical disk.

In one aspect of the optical pickup apparatus of the present invention, the optical pickup apparatus is further provided with: a parallel plate for splitting the reflected light from the lens device into two light components and causing one of the two light components to have an astigmatism characteristic; and a photodetector for receiving a far-field pattern of one of the two light components and deriving a servo control signal therefrom.

In another aspect of the optical pickup apparatus of the present invention, the linear light source may includes a light-emitting diode. The beam splitter may be adapted to reflect the light from the linear light source toward the optical disk and allow the reflected light from the objective lens to pass therethrough. The photodetector device may be adapted to serially output the unit information pieces simultaneously read.

In another aspect of the optical pickup apparatus of the present invention, the optical pickup apparatus, is further provided with: a parallel plate for splitting the reflected light from the objective lens into two light components and causing one of the two light components to have an astigmatism characteristic; and a photodetector for receiving a far-field pattern of one of the two light components and deriving a servo control signal therefrom.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIGS. 5A to 5C are is a diagrams illustrating the operation of the optical pickup apparatus shown in FIG. 3;

FIG. 7 is a diagram showing a variation of the format between adjacent track turns;

DESCRIPTION OF THE PREFERRED EMBODIMENTS

Figure 2A:
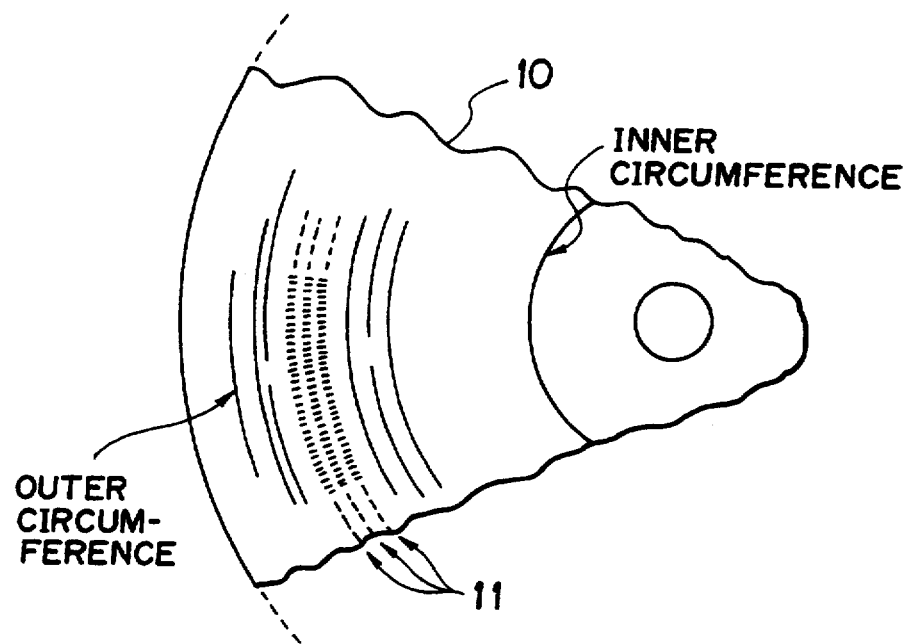
FIGS. 2A and 2B are schematic diagrams showing a signal recording format used in an embodiment of the present invention.
Figure 2B:
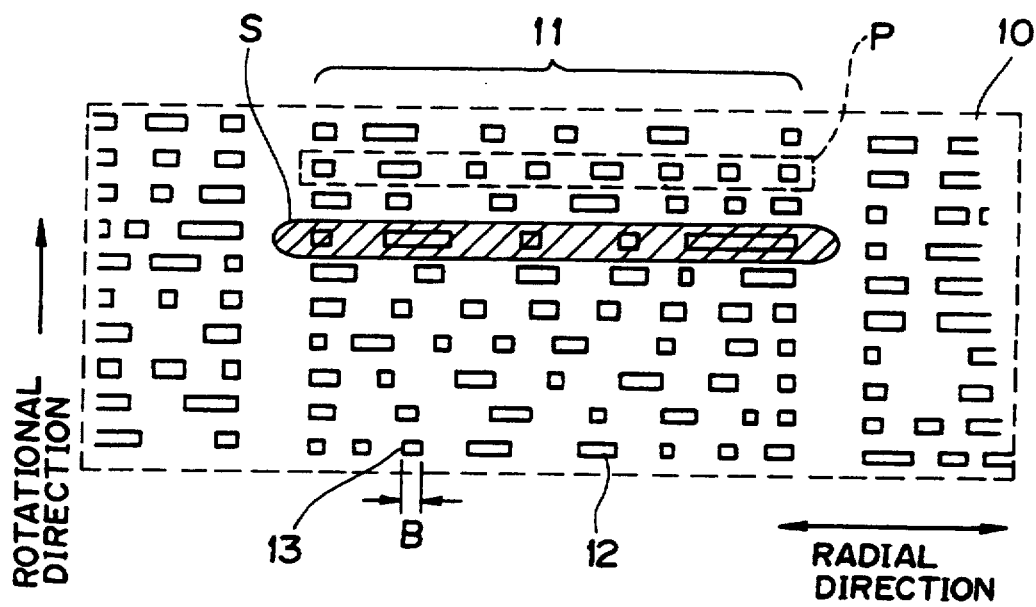

FIGS. 2A and 2B schematically illustrate a signal recording format of an optical disk according to an embodiment of the present invention. More specifically, FIG. 2A shows a part of an upper plane of an optical disk 10 on which signal tracks 11 are formed, and FIG. 2B shows some enlarged signal tracks 11. As shown in FIG. 2A, a plurality of turns of the signal track 11 are spirally formed on the disk plane so that the signal track 11 gradually expands from the inner circumference to the outer circumference. The signal track 11 includes signal pit strings arranged on the spiral signal track 11 in a circumferential direction. As shown in FIG. 2B, each of the signal pit strings has a predetermined length that defines the width of the signal track 11, and includes a plurality of pits 12 arranged in a line in the radial direction of the optical disk 10. The signal track 11 is a signal read position for accessing in the radial direction by means of a tracking mechanism of the optical pickup apparatus, as will be described later. The pits 12 correspond to information recorded on the optical disk 10. The reference numeral 13 indicates the period of one information clock (clock length B) which is a unit information piece. The length of each pit 12 and the length of each non-pit portion in the radial direction are respectively determined as being an integer multiple of the clock length B. The pit portions and non-pit portions have mutually different reflectance values. The differences in the reflectance are made by selectively sensitizing the disk plane so that sensitized portions and non-sensitized portions are created on the disk plane or by selectively changing the status of the disk plane so that crystal portions and amorphous portions are created. The area between the adjacent turns of the signal track 11 does not have any pits, so that the adjacent turns of the signal track 11 are separated from each other. The area between the adjacent turns of the signal track 11 has a high reflectance value for track identification. In FIG. 2B, the reference numeral S indicates a light spot projected onto one signal pit string P. The signal pit strings P are sequentially scanned one by one while the optical disk 10 is being rotated. In this manner, information is read for every signal pit string P by sequentially projecting the light spot S onto one signal pit string P.

Figure 1A:
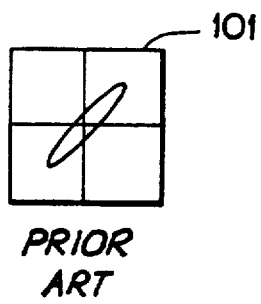
FIGS. 1A to 1C are front views of a photodetector according to the related art.
Figure 1B:
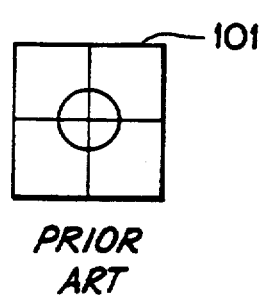
Figure 1C:
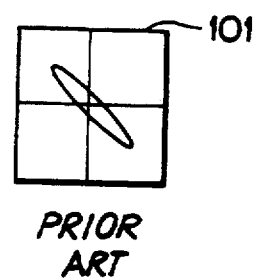
Figure 3:
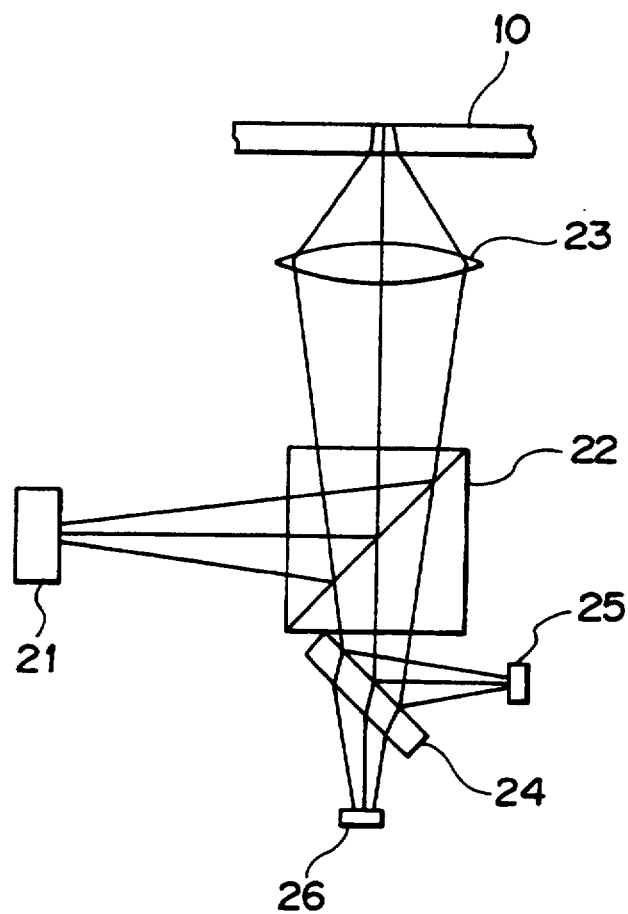
FIG. 3 is a diagram of an optical pickup apparatus of the embodiment of the present invention.

FIG. 3 shows the optical pickup apparatus used in the embodiment of the present invention being considered. The optical pickup apparatus shown in FIG. 3 includes a linear light source 21, a beam splitter 22, an objective lens 23, a parallel plate 24, a photodetector 25 for use in an RF detection, and a photodetector 26 for use in servo control. The linear light source 21 is, for example, a light-emitting diode forming a linear light source image. The beam splitter 22 splits a light from the linear light source 21 into a light directed to the optical disk 10 and a reflected light from the optical disk 10. The objective lens 23 projects the linear image formed by the linear light source 21 onto the optical disk 10, and also forms an image of the reflected light from the optical disk 10 onto the photodetectors 25 and 26. The parallel plate 24 splits the reflected light into two light components, and causes one of the two light components to have an astigmatism characteristic. The photodetector 25 for use in the RF detection is positioned so that the reflection light to which the astigmatism characteristic is not given is detected at an image forming position. The photodetector 26 for use in servo control receives a far-field pattern of the reflected light which has been caused to have the astigmatism characteristic by the parallel plate 24. The photodetector 26 for use in servo control includes a four equally divided photodiodes as in the case of the aforementioned related art shown in FIG. 1, and generates servo control signals used for tracking control and focusing control by receiving the light reflected by the optical disk 10 by means of the four equally divided photodiodes.

The optical pickup apparatus shown in FIG. 3 is equipped in an optical information recording and reproducing system or an optical information reproducing system, and is movably positioned in the radial direction of the optical disk 10 by means of a tracking mechanism (not shown). The position of the optical pickup apparatus in the radial direction is controlled by detecting error signals regarding focusing and track position on the basis of the signals detected by the photodetector 26. The above positioning control of the optical pickup apparatus can be performed in a conventional manner, and hence the description thereof will be omitted here.

Figure 4:
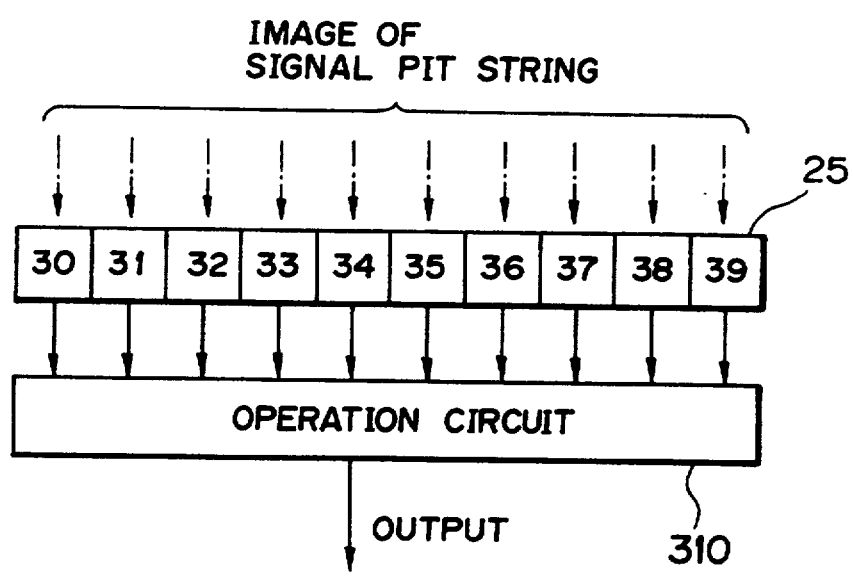
FIG. 4 is a diagram illustrating the structure of a photodetector for use in an RF detection.

FIG. 4 shows the structure of the photodetector 25 for use in the RF detection. The photodiode 25 for use in the RF detection sequentially reads information recorded on the optical disk 10 and reproduces the original signal. The photodetector 25 includes photoelectric elements 30 to 39, which are disposed so that each of the photoelectric elements 30 to 39 receives an image which is formed by the light reflected by one signal pit string P and which corresponds to one information clock length 13 (FIG. 2B). The photodetector 25 also includes an operation circuit 310, which performs a predetermined operation on output signals of the photoelectric elements 30 to 39. An output signal of the operation circuit 31 is a modulated reproduced signal.

A description will now be given for the operation of the optical pickup apparatus having the above-mentioned structure. The length of the linear light spot emitted from the linear light source 21 measured in the longest diagonal direction is made so that the linear light spot projected onto the optical disk 10 is longer than the length of the signal pit string P due to the function of the magnification of the objective lens 23, as shown in FIG. 2B. The light receiving plane of the photodetector 25 for use in the RF detection is positioned so that a linear image of the reflected light, which has been affected by the differences in the reflectance values regarding one signal pit string P, is formed on the light receiving plane of the photodetector 25. An intensity distribution F' (x, y) obtained on the light receiving plane of the photodetector 25 is written as follows:

$$F(x, y) = \int_{-\infty}^{\infty}\int_{-\infty}^{\infty} d(u, v) \int_{-\infty}^{\infty}\int_{-\infty}^{\infty} F(x, y)e^{(-2\pi i(ux+vy))} dxdy \times e^{(2\pi i(ux+vy))} dudv$$

where F(x, y) denotes an intensity distribution of a linear image formed on the optical disk 10, and d(u, v) denotes an objective pupil.

The relationship defined by the above formula is depicted as shown in FIG. 5. FIG. 5A shows the reflectance of one signal pit string P on the disk plane, FIG. 5B shows the light intensity of the linear image of one signal pit string P formed on the light receiving surface of the photodetector 25 for use in the RF detection. As shown in FIG. 5C, the photodetector 25 for use in the RF detection substantially detects and signalizes the intensity levels of the reflected light on the respective photoelectric elements.

Since the optical disk 10 has the signal recording format as shown in FIGS. 2A and 2B, the light spot S is sequentially projected onto the signal pit strings P one by one while the optical disk 10 is being rotated around its rotating axis. The linear image of the light reflected by one signal pit string P is formed on the photoelectric elements of the photodetector 25 for use in the RF detection, and information concerning the signal pit string P is simultaneously read under the control of the operation circuit 310 as shown in FIG. 4. In this manner, signals recorded on the spiral signal track 11 are sequentially read. The distance for separating the adjacent signal pit strings 11 from each other (in the rotational direction) is selected to be greater than a distance which the optical disk 10 moves by rotating with respect to the optical pickup apparatus during the time necessary for the photodetector 25 to generate the modulated reproduced signal after receipt of the reflected light forming the linear image.

It is possible to adjust the positional relationship between the linear image of the signal pit string P and the photodetector 25 for use in the RF detection, that is, to perform tracking by moving the objective lens 23 in the radial directions of the optical disk 10. A positional error, that is, a tracking error can be detected, as shown in FIG. 5C. Signal bits are recorded on both extreme ends of each signal pit string P. Photoelectric elements are provided on both extreme ends of the photodetector 25 in order to receive reflected light components from the signal bits located on both the extreme ends of each signal pit string P. The intensity levels detected by the photoelectric elements provided on both the extreme ends of the photodetector 25 are compared with each other by a comparator shown in FIG. 5C. An output signal of the comparator indicates a tracking error. The signal pit strings are sequentially detected one by one each time a maximum signal modulation factor is obtained. Alternately, it is possible to determine the timing for detecting the signal pit strings by detecting a signal component that becomes large or small within each track period.

A description will now be given of a method of recording signals on the optical disk according to the embodiment of the present invention being considered. The recording of signals on the optical disk 10 is performed as follows. A linear light source is used, which includes a plurality of aligned point light sources equal in number to the information clocks in one signal pit string. The point light sources of the linear light source are separately modulated, and lights from the point light sources are converged onto the optical disk 10 so that each linear image has the longest diagonal line directed to the radial direction. Alternatively it is possible to dispose, between the light source and the optical disk, a plurality of light modulators equal in number to the information clocks and control these light modulators without modulating the light source. It is also possible to form the signal recording format as shown in FIGS. 2A and 2B by operating one light beam. In some recording formats, the signal pit strings are not linear. However, almost the same effects as in the case of linear signal pit strings are obtained.

It will be noted that the following other embodiments of the present invention can be made. In the aforementioned embodiment, the light spot S is slightly longer than the signal track 11. It is possible to use a circular spot or a larger spot which is projected to the whole radius of the optical disk 10. The photodetector 25 for use in the RF detection has a plurality of photoelectric elements, each corresponding to one information clock length. It is also possible to use an alternative photodetector in which a group of a plurality of photoelectric elements correspond to one information clock and demodulate a signal corresponding to one information clock from signals from the group of photoelectric elements. The above alternative reproduces information more precisely.

It is possible to substitute a semiconductor laser for the light-emitting diode in order to form a linear image light source. When a semiconductor laser is used, a laser light emitted therefrom is shaped into a linear image. In this case, the linear image is a coherent image, and a light distribution on the light detecting plane of the photodetector for use in the RF detection is different from the aforementioned light distribution obtained with the light-emitting diode used. Thus, an operation suitable for the shape of the above light distribution is performed in this case.

In the aforementioned embodiment of the present invention, the pits recorded on the optical disk 10 cause a change in the reflectance. This is of a so-called amplitude grating type. The present invention includes a phase grating type recording system in which pits are recesses or projections formed on the optical disk. A light distribution obtained in this case is different from that obtained for the amplitude grating type. In this case, an operation suitable for the shape of the above light distribution is performed on the basis of a distribution obtained by calculation or experiments executed beforehand.

In the embodiment described in the foregoing, the minimum pit length is made equal to one information clock length. It is alternatively possible to define a longer minimum pit length in order to enhance the precision of signal processing.

In the aforementioned embodiments, the photodetector 25 for use in the RF detection is disposed at the image forming position of the reflected light. Alternatively, it is possible to position the photodetector 25 at a one-side focusing position of the light component to which the astigmatism characteristic has been given, because it is enough for reproducing the data to detect the reflected light which is just focused in the distributing direction of the linear image. In this case, the image on the detecting plane of the photodetector is not linear but circular or elliptical.

In the aforementioned embodiment of the present invention, the tracking control is carried out such that the pits on both the extreme ends of each signal pit string are always read by the ends of the photoelectric elements to record the signals. Alternatively, it is possible to provide calculation circuit which identifies the track positions and hence omit the adjustment in the lateral direction of the photodetector. In this case, the tracking control can be omitted by using a larger number of signal tracks to be detected than the number of signal tracks moving in the radial direction due to a deformation or off-center of the optical disk, or by saving data which is lost due to the deformation or off-center of the optical disk in a memory element and executing recovering of data by use of the saved data afterward.

The photodetector 26 for use in servo control in the aforementioned embodiment of the present invention generates the control signals for the tracking servo and focusing servo by using the light splitted from the light reflected by the optical disk 10. Alternatively, it is possible to employ another control process in which the photodetector 25 for use in the RF control is also operated for the servo control by maintaining the detection signal at the maximum level, or a light reflected by the photodetector 25 may be used for the servo control.

In the aforementioned embodiment of the present invention, the linear light source having a plurality of light-emitting diodes arranged in a line are used for making it possible to simultaneously read pits arranged in a line. Alternatively, it is possible to execute switching of the light-emitting diodes at a speed higher than the signal frequency and hence serially read the signals in one pit string in a time division manner. In the aforementioned embodiment of the present invention, the output signal of the operation circuit 310 of the photodetector 25 for use in the RF detection is directly used. It is also possible to employ a digital filtering scheme, such as a spatial filter, in order to execute the signal processing more precisely.

Figure 6A:
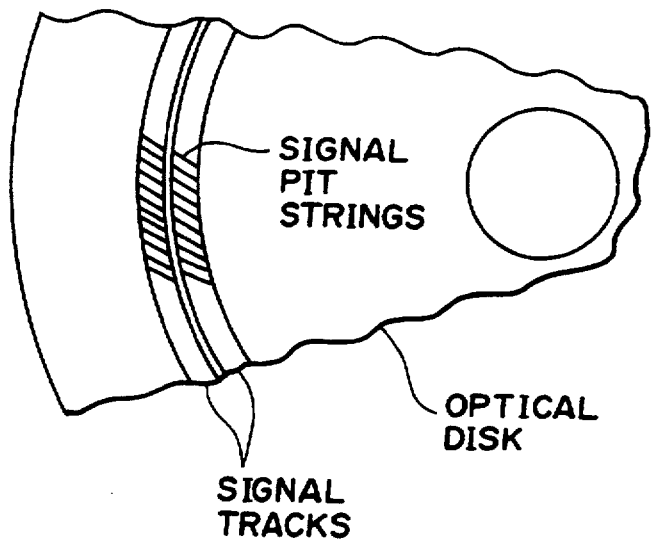
FIGS. 6A and 6B are diagrams showing other signal recording formats which can be used for the optical disk of the present invention.
Figure 6B:
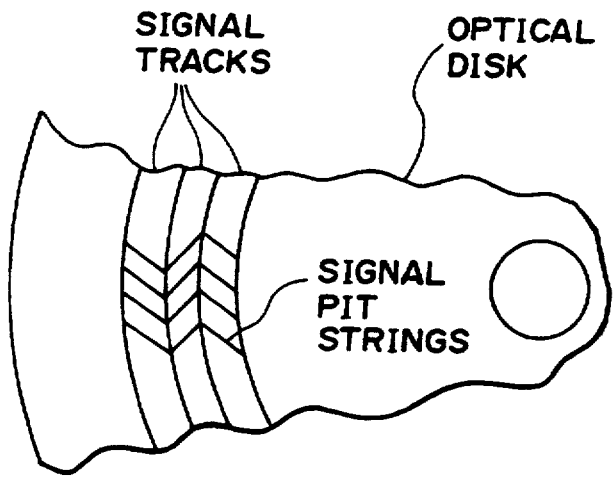

It is possible to use signal recording formats as shown in FIGS. 6A and 6B instead of the signal recording format shown in FIGS. 2A and 2B. In the signal recording format shown in FIG. 6A, the signal pit strings on the signal track are obliquely arranged at a predetermined angle with respect to the radial direction of the optical disk. In the signal recording format shown in FIG. 6B, the signal pit strings on the adjacent signal track are obliquely arranged at different angles. The signal recording format shown in FIG. 6B does not have a non-signal area between the signal track turns, resulting in the increase of signal recording density on the whole.

In the aforementioned embodiment of the present invention, the high-reflectance area is formed between the adjacent signal track turns. Alternatively, as shown in FIG. 7, it is possible to arrange concentric signal track turns or spiral signal track turns 601 and 602 between signal tracks 61 and 62 and between 62 and 63. A plurality of pits corresponding to predetermined information, such as address information, are formed on the concentric or spiral signal track turns 601 and 602.

Figure 8:
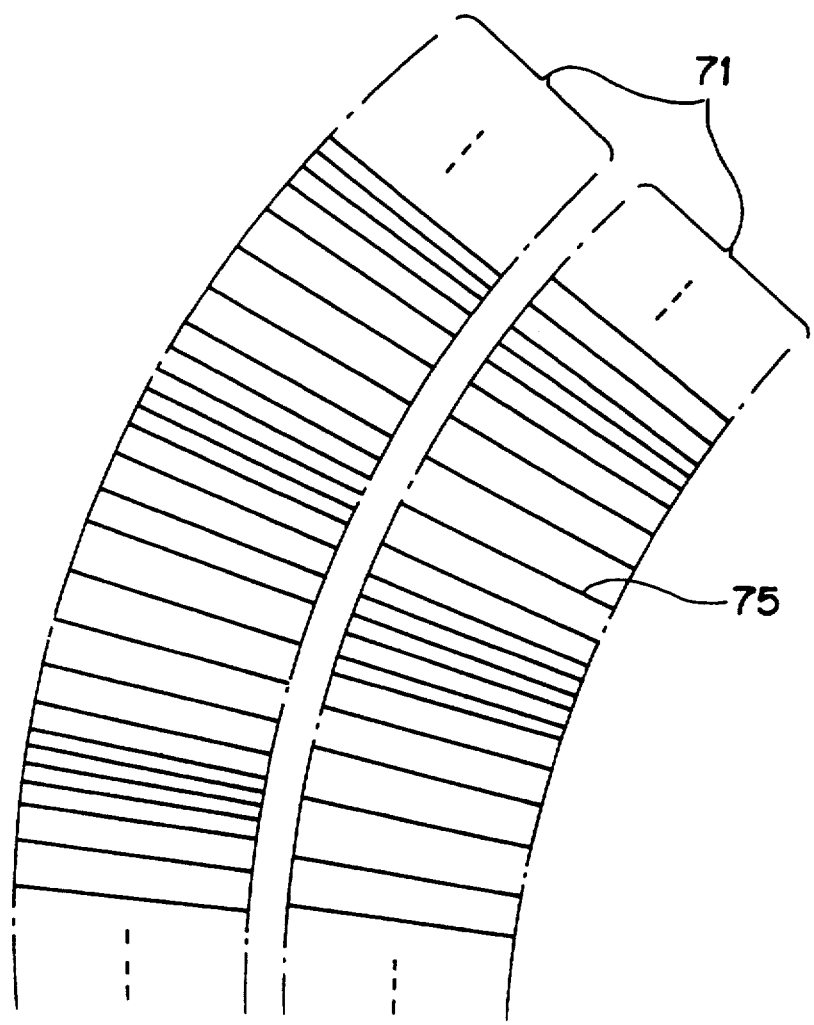
FIG. 8 is a diagram illustrating another signal recording format which can be used for the optical disk of the present invention.

In the aforementioned embodiment of the present invention, the signal track has a constant width, and the signal pit strings are spaced apart from each other at a fixed distance. Alternatively, as shown in FIG. 8, it is possible to modulate the interval between adjacent signal pit strings 75 on the track turns 71 in accordance to recording signals. Hence, information, such as music information, can be recorded on the optical disk by using not only the pits but also the modulation of the intervals between the adjacent signal pit strings. In this manner, an increased quantity of information can be recorded on the optical disk.

Figure 9:
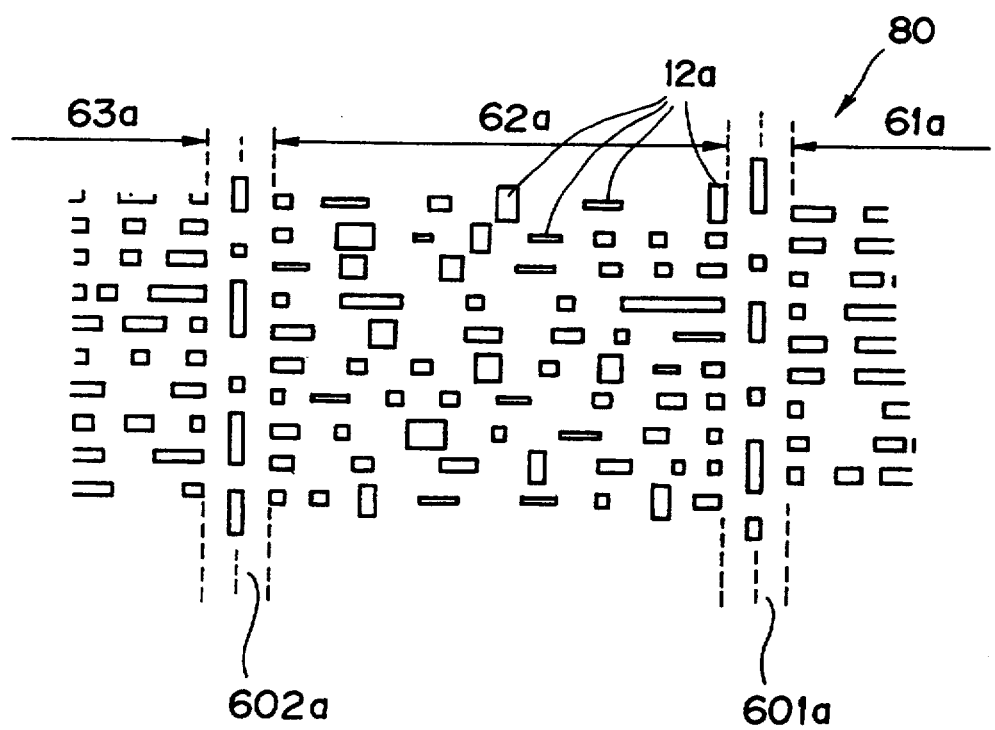
FIG. 9 is a diagram showing another signal recording format which can be used for the optical disk of the present invention.

In the aforementioned embodiment of the present invention, each signal pit has a constant width as clearly seen from FIG. 7. Alternatively, as shown in FIG. 9, it is possible to modulate the width of the signal pit 12a. Other constructions i.e. signal tracks 61a, 62a, 63a, and spiral signal track turns 601a, 602a etc., of the optical disk 80 in FIG. 9 are similar to those of the optical disk in FIG. 7. Hence, information, such as music information, can be recorded on the optical disk by using not only the pits but also the modulation of the pit width. In this manner, an increased quantity of information can be recorded on the optical disk.

As has been described in the foregoing, according to the present invention, the light spot is sequentially projected onto the signal pit strings and a plurality of unit information pieces are simultaneously read by means of a plurality of photoelectric elements receiving a linear image formed by the reflected light obtained by sequentially projecting the light spot onto the signal pit strings. With this structure, it becomes possible to improve the information reading speed and the information transferring speed. Further, since the focused image formed by the reflected light from the signal pit string is used, the signal resulting from the signal pit string has a reduced crosstalk, and hence an increased recording density can be obtained. Furthermore, since the light spot can be formed by a less-expensive light source, such as a light-emitting diode, it is not necessary to build a laser resonator in an opto-electric integrated circuit. Hence, a simple and compact optical pickup apparatus can be produced.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An optical disk comprising:
  a recording medium having a disk shape;
  a plurality of signal pit strings formed on said recording medium arranged in a circumferential direction of said optical disk, each of said signal pit strings including a plurality of signal pits arranged in a line in a radial direction of said optical disk, each of said signal pits having a length in the radial direction corresponding to an integer multiple of a length of one information clock which is a unit information piece,
  wherein each of said signal pit strings has a predetermined length in said radial direction,
  said signal pit strings are spirally arranged in said circumferential direction to form a spiral signal track, and
  said signal pit strings are obliquely arranged such that said signal pit strings adjacent to each other with respect to said radial direction are obliquely arranged at different angles with each other.

2. An optical disk as claimed in claim 1, wherein said signal pit strings adjacent to each other with respect to said circumferential direction are spaced from each other at variable intervals modulated by information to be recorded on the optical disk.

3. An optical disk as claimed in claim 1, wherein said signal pits have variable widths with respect to said circumferential direction modulated by information to be recorded on the optical disk.

4. An optical disk as claimed in claim 1, wherein said signal pits are arranged such that an interval between adjacent signal pits in one signal pit string corresponds to the integer multiple of the length of said one information clock.

5. An optical disk comprising:
  a recording medium having a disk shape; and
  a plurality of signal pit strings formed on said recording medium arranged in a circumferential direction of said optical disk, each of said signal pit strings including a plurality of signal pits arranged in a line in a radial direction of said optical disk, each of said signal pits having a length in the radial direction corresponding to an integer multiple of a length of one information clock which is a unit information piece,
  wherein each of said signal pit strings has a predetermined length in said radial direction, and
  said signal pit strings are spirally arranged in said circumferential direction to form a spiral signal track,
  said optical disk further comprising:
  another signal track interposed between adjacent turns of said spiral signal track and including a plurality of pits arranged in said circumferential direction.

6. A method of recording signals on an optical disk, comprising the step of:
  forming a plurality of signal pit strings on the optical disk such that said signal pit strings are arranged in a circumferential direction of the optical disk and that each of said signal pit strings includes a plurality of signal pits arranged in a line in a radial direction of the optical disk, each of said signal pits having a length on the radial direction corresponding to an integer multiple of a length of one information clock which is a unit information piece,
  wherein each of said signal pit strings has a predetermined length in said radial direction,
  said signal pit strings are spirally arranged in said circumferential direction to form a spiral track, and
  said signal pit strings are obliquely arranged such that said signal pit strings adjacent to each other with respect to said radial direction are obliquely arranged at different angles with each other.

7. An optical pickup apparatus for reproducing an optical disk in which a plurality of signal pit strings are arranged in a circumferential direction of the optical disk, and each of said signal pit strings includes a plurality of signal pits arranged in a line in a radial direction of the optical disk, each of said signal pits having a length in the radial direction corresponding to an integer multiple of a length of one information clock which is a unit information piece, wherein each of said signal pit strings has a predetermined length in said radial direction, said signal pit strings are spirally arranged in said circumferential direction to form a spiral signal track, and said signal pit strings are obliquely arranged such that said signal pit strings adjacent to each other with respect to said radial direction are obliquely arranged at different angles with each other, said optical pickup apparatus comprising:
  light spot projection means for projecting a light spot onto the optical disk;
  lens means, operatively coupled to said light spot projection means, for converging a reflected light from the light spot; and
  photodetector means including a plurality of photoelectric elements, for simultaneously reading a plurality of unit information pieces contained in one of the signal pit strings at which the light spot is sequentially projected, said photoelectric elements having respective light receiving planes located at a position where the reflected light from said lens means forms an image.

8. An optical pickup apparatus as claimed in claim 7, further comprising:
  a parallel plate for splitting the reflected light from said lens means into two light components and causing one of the two light components to have an astigmatism characteristic; and
  a photodetector for receiving a far-field pattern of said one of the two light components and deriving a servo control signal therefrom.

9. An optical pickup apparatus for reproducing an optical disk in which a plurality of signal pit strings are arranged in a circumferential direction of the optical disk, and each of said signal pit strings includes a plurality of signal pits arranged in a line in a radial direction of the optical disk, each of said signal pits having a length in the radial direction corresponding to an integer multiple of a length of one information clock which is a unit information piece, wherein each of said signal pit strings has a predetermined length in said radial direction, said signal pit strings are spirally arranged in said circumferential direction to form a spiral signal track, and said signal pit strings are obliquely arranged such that said signal pit strings adjacent to each other with respect to said radial direction are obliquely arranged at different angles with each other, said optical pickup apparatus comprising:
  a linear light source having a linear light source image;
  an objective lens for converging a light from the linear light source to project a light spot onto one of the signal pit strings and for converging a reflected light therefrom;
  a beam splitter for orienting the light from the linear light source toward the optical disk and allowing the reflected light from said objective lens to pass therethrough; and
  photodetector means including a plurality of photoelectric elements, for simultaneously reading a plurality of unit information pieces contained in one of the signal pit strings at which the light spot is sequentially projected, said photoelectric elements having respective light receiving planes located at a position where the reflected light from said objective lens forms an image.

10. An optical pickup apparatus as claimed in claim 9, wherein said linear light source comprises a light-emitting diode.

11. An optical pickup apparatus as claimed in claim 9, wherein said beam splitter is adapted to reflect the light from the linear light source toward the optical disk and allow the reflected light from said objective lens to pass therethrough.

12. An optical pickup apparatus as claimed in claim 9, wherein said photodetector means is adapted to serially output the unit information pieces simultaneously read.

13. An optical pickup apparatus as claimed in claim 9, further comprising:
  a parallel plate for splitting the reflected light from said objective lens into two light components and causing one of the two light components to have an astigmatism characteristic; and
  a photodetector for receiving a far-field pattern of said one of the two light components and deriving a servo control signal therefrom.

14. An optical pickup apparatus for reproducing an optical disk in which a plurality of signal pit strings are arranged in a circumferential direction of the optical disk, and each of said signal pit strings includes a plurality of signal pits arranged in a line in a radial direction of the optical disk, each of said signal pits having a length in the radial direction corresponding to an integer multiple of a length of one information clock which is a unit information piece, wherein each of said signal pit strings has a predetermined length in said radial direction, said signal pit strings are spirally arranged in said circumferential direction to form a spiral signal track, said optical disk comprising another signal track interposed between adjacent turns of said spiral signal track and including a plurality of pits arranged in said circumferential direction, said optical pickup apparatus comprising:
  light spot projection means for projecting a light spot onto the optical disk;
  lens means, operatively coupled to said light spot projection means, for converging a reflected light from the light spot; and
  photodetector means including a plurality of photoelectric elements, for simultaneously reading a plurality of unit information pieces contained in one of the signal pit strings at which the light spot is sequentially projected, said photoelectric elements having respective light receiving planes located at a position where the reflected light from said lens means forms an image.

* * * * *